(12) United States Patent
Grand et al.

(10) Patent No.: US 6,606,875 B1
(45) Date of Patent: Aug. 19, 2003

(54) CONTAINER WITH MOVABLE BULKHEADS

(75) Inventors: Alain Grand, Le Mesnil-Esnard (FR); Bernard Valentin, Saint Didier Mont d'Or (FR); Philippe Vaas, Mesnil Raoul (FR)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/189,102

(22) Filed: Jul. 2, 2002

(51) Int. Cl.⁷ .......................... F25D 21/00; F25D 23/00
(52) U.S. Cl. .................. 62/239; 62/285; 62/329
(58) Field of Search ............... 62/239, 285, 329

(56) References Cited

U.S. PATENT DOCUMENTS

| | | | |
|---|---|---|---|
| 4,459,821 A | * 7/1984 | Cabell et al. ............... | 62/239 |
| 4,505,126 A | * 3/1985 | Jones et al. ................ | 62/239 |
| 4,887,437 A | * 12/1989 | Fenton et al. .............. | 62/186 |
| 5,054,295 A | * 10/1991 | Goulooze ................... | 62/239 |
| 6,289,684 B1 | * 9/2001 | Guidry, et al. ............. | 62/229 |

* cited by examiner

Primary Examiner—William E. Tapolcai
(74) Attorney, Agent, or Firm—Wall Marjama & Bilinski LLP

(57) ABSTRACT

An enclosed container for storing temperature sensitive goods. The container has opposed side walls and end walls as well as a floor and a ceiling. First and second bulkheads are moveably mounted within the container for dividing the container into three separate compartments. Two end compartments are services by fixed heat exchanges for conditioning the air in the compartments. A center compartment is serviced by a movable heat exchanger. By repositioning the bulkheads and the movable heat exchanger the volume and thus the load carrying capacity of the compartments can be varied to accommodate different types of cargo and the temperature levels in the compartment independently maintained.

19 Claims, 4 Drawing Sheets

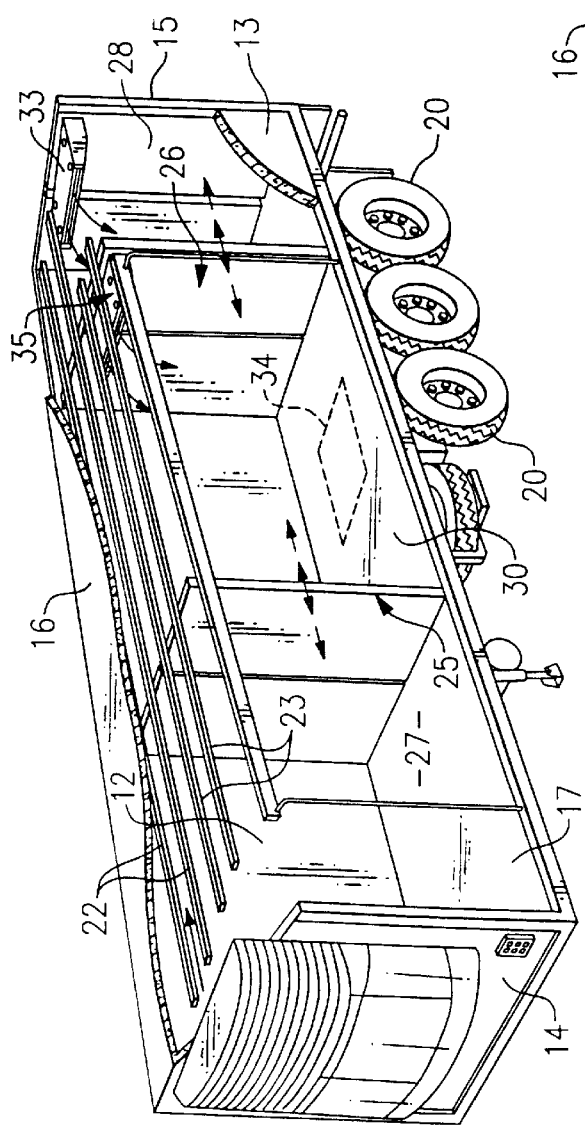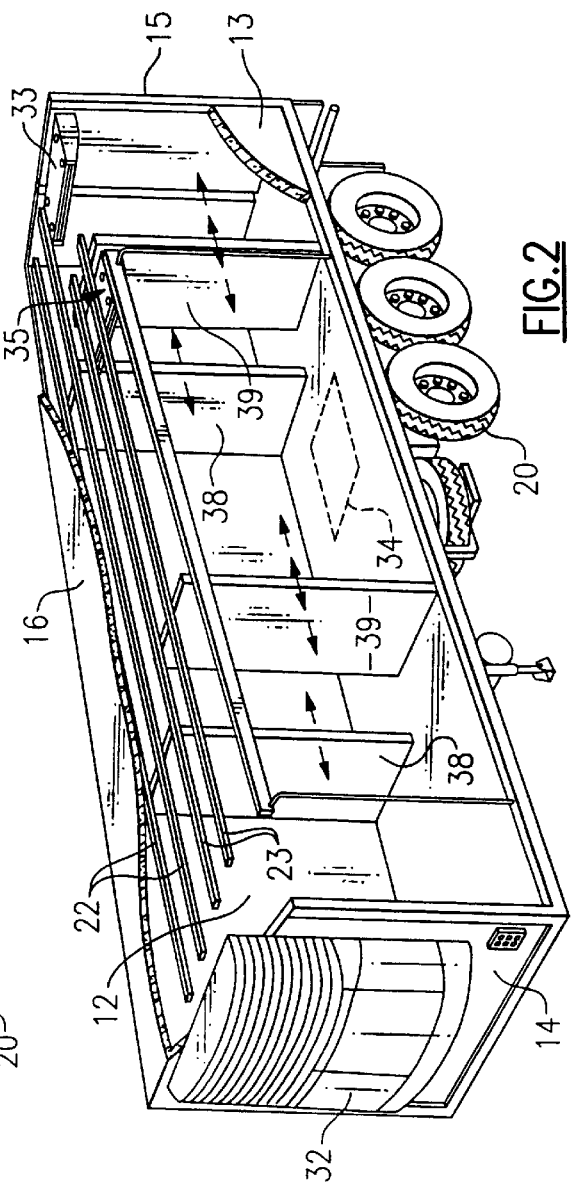

CONTAINER WITH MOVABLE BULKHEADS

FIELD OF THE INVENTION

This invention relates to a container for storing goods in a plurality of temperature controlled compartments and, in particular, to a container having a plurality of multi-temperature compartments wherein the volume of the compartments can be selectively changed to better accommodate varying loads.

BACKGROUND OF THE INVENTION

More specifically, this invention relates to a mobile container for transporting goods that require the atmosphere in the container to be temperature controlled. Generally, the container is equipped with a single air conditioning unit that is adapted to maintain the interior of the container at a given temperature. To be profitable, the container is generally required to carry a full load of one class of goods. Some containers have been devised having a plurality of internal compartments, however, maintaining the compartments at different temperature has proven to be rather difficult. In addition, the volume and thus the carrying capacity of each compartment is fixed providing little in the way of flexibility to accommodate various size loads.

SUMMARY OF THE INVENTION

It is therefore an object of the present invention to improve containers for storing goods and, in particular, mobile containers for transporting goods that require a temperature controlled environment.

A further object of the present invention is to provide a mobile container having a plurality of compartments each of which can be independently temperature controlled.

A still further object of the present invention is to provide a mobile container having a plurality of temperature controlled compartments the volume of which can be selectively varied to facilitate different classes of temperature sensitive goods.

These and other objects of the present invention are attained by an enclosed container for storing temperature sensitive goods that has opposed side walls and end walls, a floor and a ceiling. First and second intermediate bulkheads are movably supported within the container which serve to divide the container into three air tight compartments. By repositioning the bulkheads, the volume and thus the load carrying capacity of the compartments can be varied. The two end compartments of the container are serviced by fixed heat exchangers while the center compartment is serviced by a movable heat exchanger whereby the temperature in each compartment can be tightly controlled at differing levels.

BRIEF DESCRIPTION OF THE DRAWING

For a better understanding of these and objects of the invention, reference will be made to the following detailed description of the invention which is to be read in association with the accompanying drawing, wherein:

FIG. 1 is a perspective view of a mobile container that embodies the teachings of the present invention;

FIG. 2 is a perspective view of the mobile container illustrated in FIG. 1 further showing movable wall panels utilized in the practice of the invention being relocated;

DETAILED DESCRIPTION OF THE INVENTION

Figure 3:
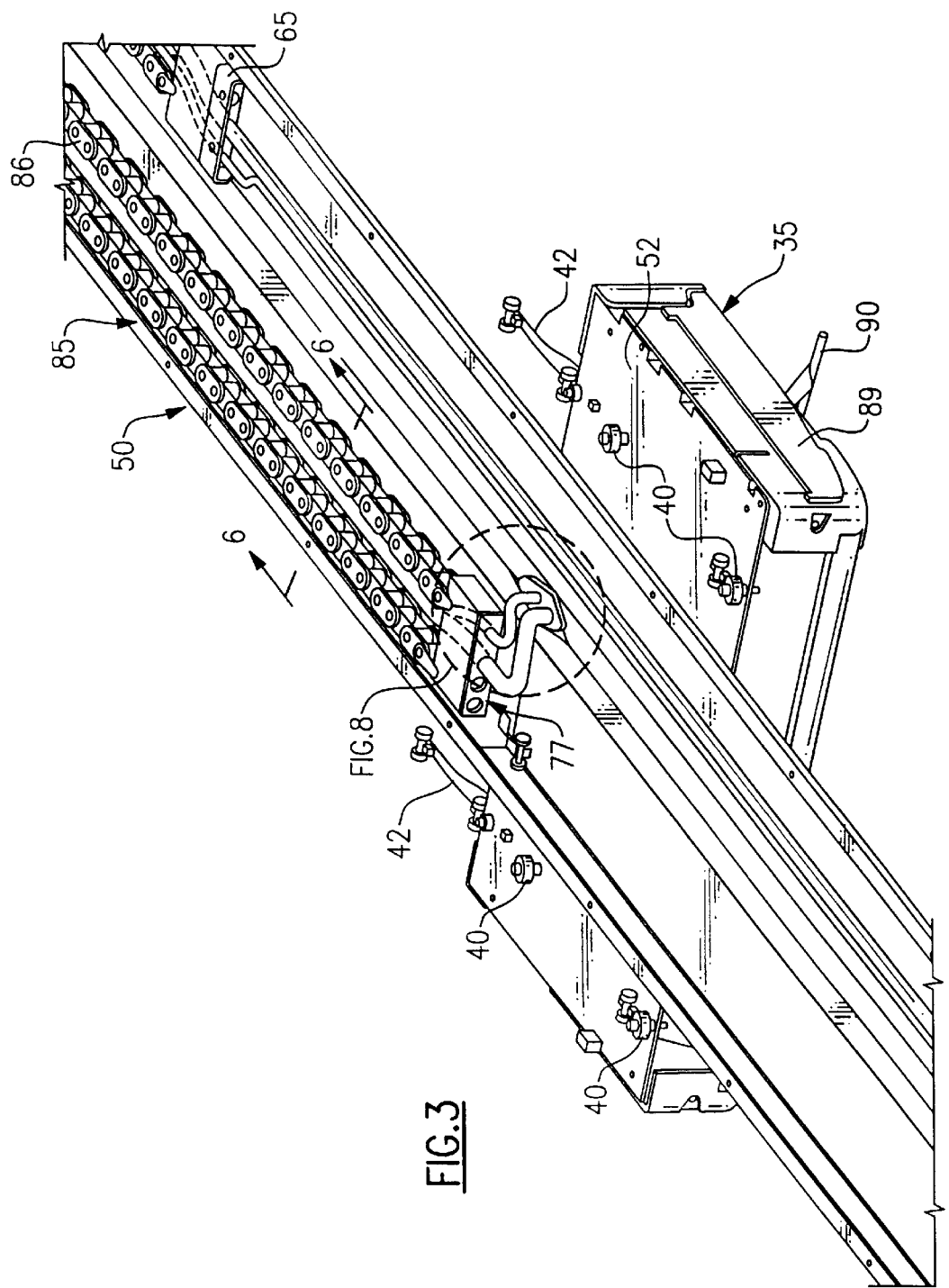
FIG. 3 is an enlarged partial top view in perspective with sections broken away illustrating the moving heat exchanger employed in the practice of the present invention and the housing that contains the lines for servicing the heat exchanger.

Turning now to FIGS. 1 and 2, there is illustrated an enclosed container generally referenced 10, that embodies the teaching of the present invention. The container is generally rectangular in form and contains two opposed side walls 12 and 13, two end walls 14 and 15 as well as a roof or ceiling 16 and a floor 17. Preferably, the container is mobile being equipped with a plurality of wheels 20—20 that enables the container to be transported from place to place by a tractor or the like (not shown). Two sets of parallel rails 22 and 23 are suspended inside the container from the container roof. As will be explained in further detail below, two bulkheads 25 and 26 are hung from the rails so that they can be repositioned substantially along the entire length of the container. The bulkheads extend across the width of the container to divide the container into three separate compartments that include two end compartments, and 27 and 28 and a center compartment 30.

The bulkheads are provided with appropriate peripheral seals so that the air in each compartment can be individually conditioned to a desired temperature level. The bulkheads can be moved over the rails to an infinite number of locations thereby altering the volume of the compartments to satisfy changing load demands.

The two end compartments are each serviced by an air conditioning unit such as unit 32 mounted upon an adjacent end wall of the compartment. A separate heat exchanger, such as heat exchanger 33 is also mounted in each end compartment, preferably from the ceiling through which conditioned air is exchanged for compartment return air. The center compartment is serviced by another air conditioning unit 34 that may be located beneath the floor of the container or any other convenient place. A heat exchanger 35 is mounted within the center compartment. As will be explained in greater detail below, the heat exchanger is coupled to air conditioning unit 34 by flexible service lines. The heat exchanger 35 is movably suspended from rails 23 and can be repositioned substantially along the entire length of the container along with the bulkheads.

Although each bulkhead can be fabricated as a one piece section, the present bulkheads include two separate panels 38 and 39 that are suspended from rail sets 22 and 23, respectively, so that each panel can be independently repositioned with relative ease by one person. As best illustrated in FIG. 2, the heat exchanger 35 is mounted upon rails 23 adjacent to one of the panels 39. The heat exchanger and the panel joined together so that the two can be moved as a unit along rails 23.

Figure 5:
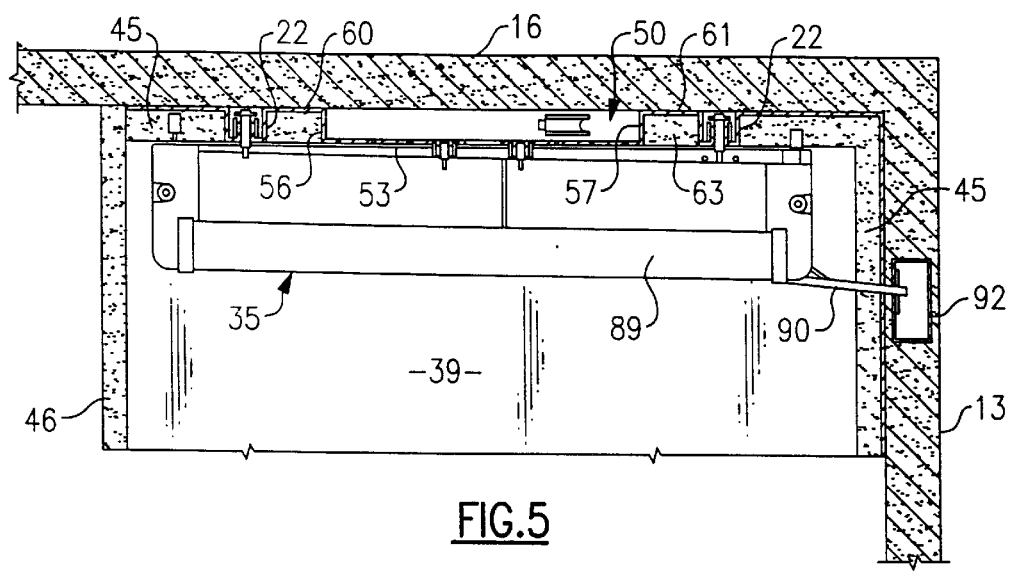
FIG. 5 is an enlarged partial end view in section illustrating the heat exchanger being suspended from rails located in the ceiling of the container.

Turning now to FIGS. 3 and 5, the heat exchanger 35 contains a series of rollers 40 that are slidably contained in the rails 22 so that heat exchanger can roll easily to any one of an infinite number of positions along the length of the rails. The panels 38 and 39 are similarly suspended from the rails. The heat exchanger 35 is attached to an adjacent one of the panels by means of a pair of tie rods 42 so that the heat exchanger and the panel remain connected as the panel is being rolled along the rails to a selected position.

As best illustrated in FIG. 5, seals are mounted about the entire periphery of each panel and are arranged to ride in sealing contact against the side walls, ceiling and floor of the container to prevent air from moving therebetween. A separate vertically disposed seal 46 is also mounted along the inboard edge of each panel. The inboard seals of the two panels making up one of the bulkheads are adapted to mate when the panels are brought into coplanar alignment thereby preventing air from moving between the panels. As should be now evident, the panel may be positioned so that three separate compartments are established within the container and the size of each compartment can be varied within the range of the rails to accommodate a given load. In addition, because each compartment is serviced by an individual air conditioning unit, the temperature level within each compartment may also be individually regulated to a desired setting best suited to preserve the goods store therein.

Figure 6:
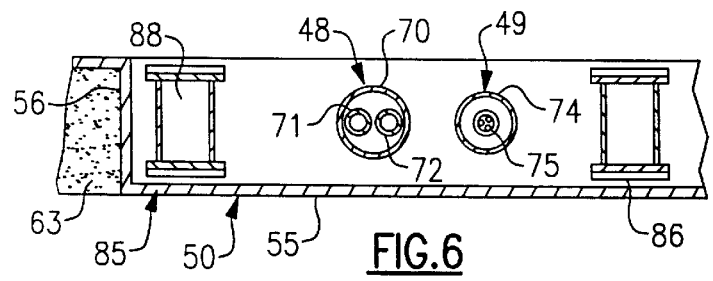
FIG. 6 is a sectional view taken along lines 6—6 in FIG. 3.

As shown in FIG. 6, the service to the heat exchanger is carried by flexible conduits 48 and 49. The lines are contained within a stainless steel housing generally referenced 50. The housing is secured to the container ceiling immediately above the heat exchanger with the housing running parallel to the rails 22. The height of the housing is slightly less than that of the panel seal 45 and accordingly, the housing fits between the top edge of the panel 39 and the roof 16 of the container. A thin auxiliary seal 53 is secured to the outside surface of the housing floor which rides in sealing contact against the panel to prevent air from passing therebetween.

Figure 4:
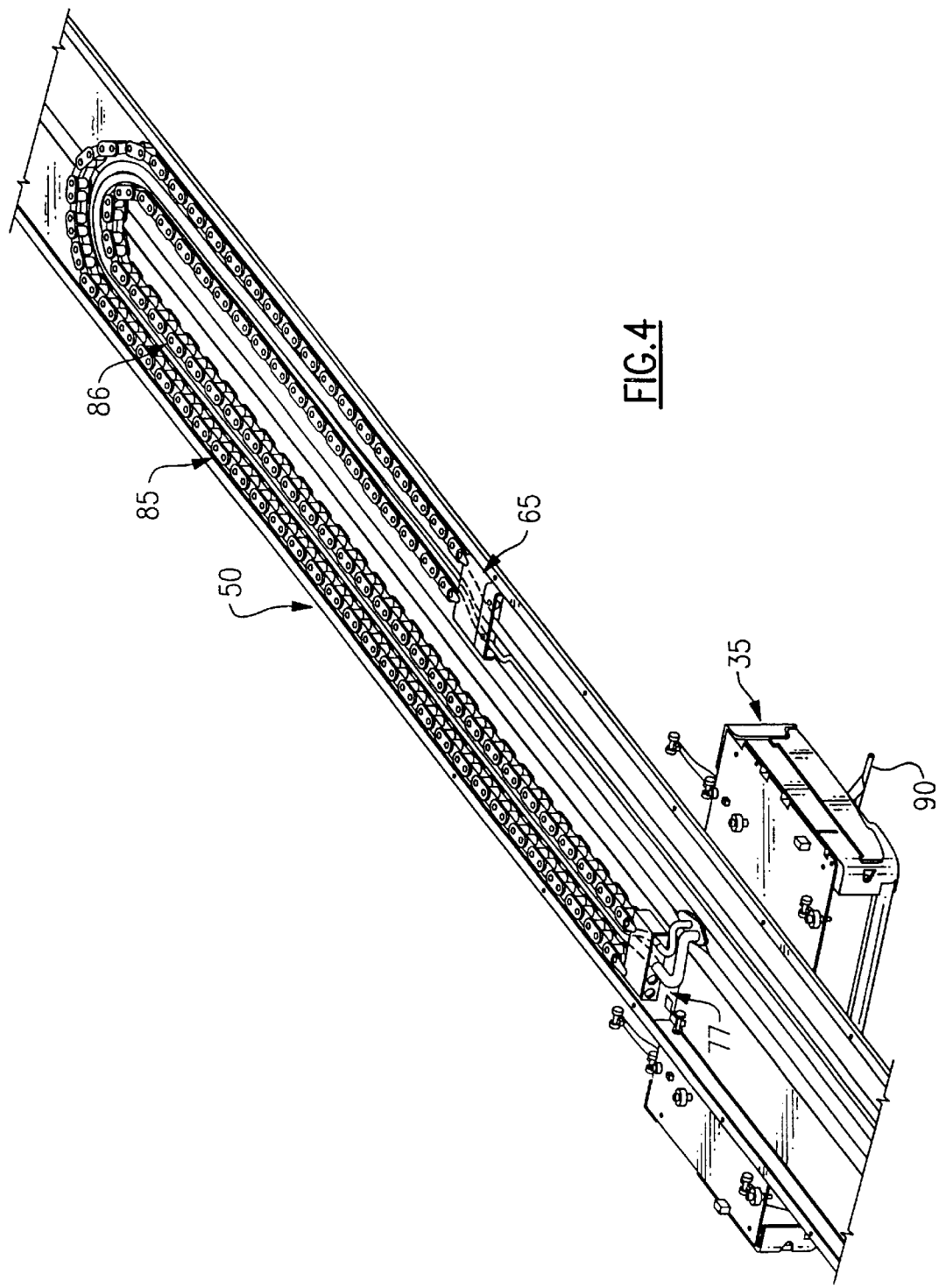
FIG. 4 is a view similar to that in FIG. 3 further illustrating the chain mechanism for guiding the service lines within the housing as the heat exchanger is being repositioned.

The housing 50 consists of a channel shaped trough having a bottom wall 55 and a pair of side walls 56 and 57. A pair of side flanges 60 and 61 are attached to the side walls which contain blocks of insulation 63. In assembly the body of the channel shaped housing closes against the ceiling of the container and the housing is totally enclosed by a pair of end walls (not shown). As illustrated in FIGS. 3 and 4, a fixed connector 65 is mounted in the bottom wall of the housing and serves to couple refrigeration lines and electrical lines extend along the bottom wall of the housing to one end of flexible conduits 48 and 49 located inside the housing. As illustrated in FIG. 6, flexible conduit 48 includes a tubular sheath 70 that contains a refrigerant supply line 71 and a refrigerant return line 72. The flexible electric conduit 49 includes a tubular sheath 74 that contains an electrical cable 75. The other end of each flexible service conduit, in turn, are coupled to a movable connector 70.

The opposite ends of the flexible conduits are attached to a movable connector generally referenced 77. The movable connector includes a bracket 78 for supporting the refrigerant and electrical conduits. The bracket slidably is mounted upon the bottom wall of the housing. The two conduits are further supported in a slide plate 82 of the bracket so that they can pass downwardly toward the heat exchanger 35 through an elongated slotted opening 83 provided in the bottom wall of he housing. A penetratable seal 84 is carried in the opening 83 that permits the conduits to pass out of the housing without appreciable loss of air from the compartments. A rigid L-shaped arm 84 is attached at one end to the bracket and passes downwardly through the seal. The opposite end of the arm is secured to the heat exchanger 35 so that the bracket and the heat exchanger move together when the heat exchanger is being repositioned.

The flexible tubes that carry the service lines are contained within the housing between an outer chain 85 and a spaced apart inner chain 86. The chains are formed of plastic links 87 that have a vertical height that is slightly less than the height of the housing body. When the housing body is closed against the ceiling of the container, the links of the chains are held in an upright posture as illustrated in FIG. 6. Each link is pivotably secured to its neighbor by a vertically disposed pin 88. The chains are arranged in the housing so that establish a well defined U-configuration between the side walls of the housing. The length of the chains are such that they will hold the U-shaped configuration as the heat exchanger moves back and forth over its prescribed path of travel. Accordingly, the flexible conduits captured between the chains are able to track along with the heat exchanger without twisting or snagging while at the same time preserving the air tight integrity of the compartments.

Figure 7:
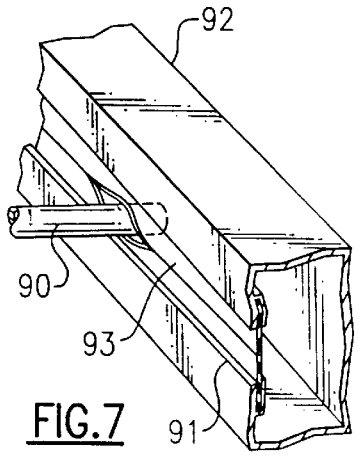
FIG. 7 is a partial perspective view of a drain trough for carrying away condensation developed in the movable condenser.
Figure 8:
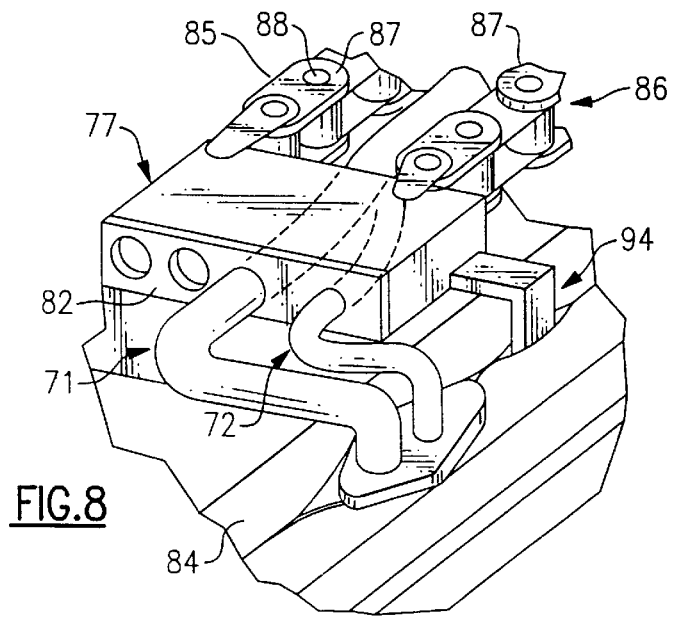
FIG. 8 is an enlarged partial perspective view further illustrating a service line connector for coupling the service lines to the heat exchanger.

The heat exchanger 35, particularly when operating as an evaporator, will develop condensate. The condensate is collected in the pan 89 (FIG. 5) of the unit which is contoured to direct the condensate to a drain that includes a drain pipe 90. As shown in FIGS. 5 and 7, the drain pipe is arranged to pass through an elongated vertically disposed slot 91 in one side wall of a trough 92. The trough is mounted in one side wall 13 of the container adjacent to the path of travel of the heat exchanger 35 and extends along the path of travel of the heat exchanger. Here again the elongated opening in the trough is closed by a penetratable seal 93 through which the drain pipe passes. The trough is arranged to direct the condensate to an outlet which discharges the condensate from the container.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A container for storing heat sensitive goods that includes:

a pair of opposed side walls, a pair of opposed end walls and a floor and a ceiling for enclosing the container, a first bulkhead and a second bulkhead extending between said ceiling and said floor for dividing the container into three separate compartments that include two end compartments and a center compartment, means to reposition said bulkheads within said container whereby the volume of the compartments may be varied, a first fixed heat exchanger mounted on one end wall of the container for providing conditioning air to one end compartment, a second fixed heat exchanger mounted on a second end compartment for providing conditioning air to a second end compartment; and a third movable heat exchanger mounted adjacent to one of said bulkheads that is repositionable with said one of said bulkheads for providing condition air to a center compartment.

2. The container of claim 1 that further includes wheels whereby said container is mobile.

3. The container of claim 1 wherein said bulkheads are movably suspended upon rails that are mounted in the ceiling of the container wherein the bulkheads can be repositioned to vary the volume of said compartments.

4. The container of claim 3 wherein said bulkheads are equipped with seals extending about the periphery of each bulkheads for preventing conditioned air from moving between compartments whereby each compartment can be maintained at a different temperature level.

5. The container of claim 1 wherein said each bulkhead includes two separate panels and each panel is suspended from the container ceiling by a pair of rails so that each panel can be independently positioned, each of said panels being provided with peripheral seals that surround the panel.

6. The container of claim 5 wherein said movable heat exchanger is suspended from one pair of rails so that said movable evaporator is repositionable with one of said panels suspended upon said one pair of rails.

7. The container of claim 1 wherein said movable heat exchanger is connected to an air conditioning unit by flexible service lines that are loosely contained within an elongated housing suspended from the ceiling of the container so that said service lines can be slidably repositioned within said housing as the movable heat exchanger is repositioned.

8. The container of claim 7 wherein said housing is rectangular shaped having a horizontally disposed bottom wall and vertically disposed spaced apart side walls, said housing being mounted above said one panel.

9. The container of claim 8 wherein the vertical height of the housing is less than the thickness of the peripheral seals surrounding the panels whereby the said one panel can move beneath said housing.

10. The container of claim 9 that further includes a secondary seal mounted between the top of said one panel and the bottom wall of said housing, said secondary seal being secured to said one panel for movement therewith.

11. The container of claim 10 that further includes a movable connector mounted inside said housing for coupling one end of the flexible service lines to said movable heat exchanger and a stationary connector mounted inside the housing for coupling the opposite end of said service lines to an air conditioning unit.

12. The container of claim 11 that includes further means for attaching the movable connector to the movable heat exchanger.

13. The container of claim 11 that further includes a pair of spaced apart inner and outer chains extending between the movable connector and the stationary connector so that each chain maintains a U-shaped within said housing as the movable connector moves between a first home position and a second fully extended position and wherein flexible service lines being contained between said spaced apart chains.

14. The container of claim 12 wherein each chain contains plastic links that are rotatably coupled a neighboring link by vertically disposed pivot pins.

15. The container of claim 14 wherein the vertical height of the clain links is slightly less than the vertical height of the housing so that the flexible service lines are captured between the inner and outer chains.

16. The container of claim 15 wherein said outer chains is arranged to track along the opposed side walls of the housing as the movable heat exchanger is repositioned.

17. The container of claim 14 wherein the bottom wall of the housing contains a penetratable seal through which the movable connector is coupled to the movable evaporator.

18. The container of claim 1 that further includes a drain trough mounted in one side wall of the container adjacent to the movable heat exchanger, said drain trough extending horizontally along the length of travel of said movable heat exchanger and further includes a drain tube passing from the evaporator into said trough through a elongated slotted opening in a side wall of said trough whereby condensate from the evaporator is passed into the trough.

19. The container of claim 18 wherein the slotted opening in the trough is closed by a penetratable seal.

* * * * *